United States Patent Office 2,702,920
Patented Mar. 1, 1955

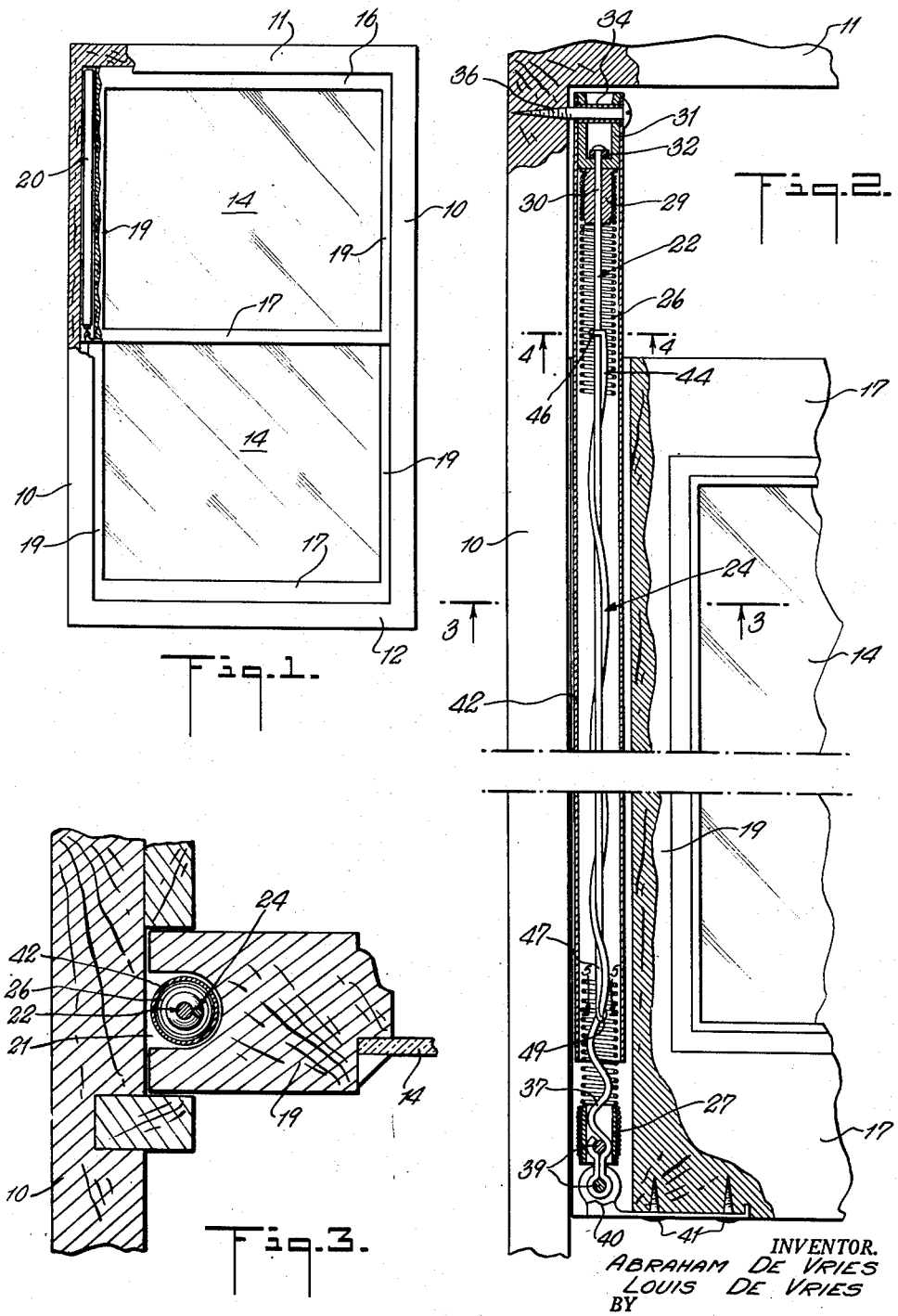

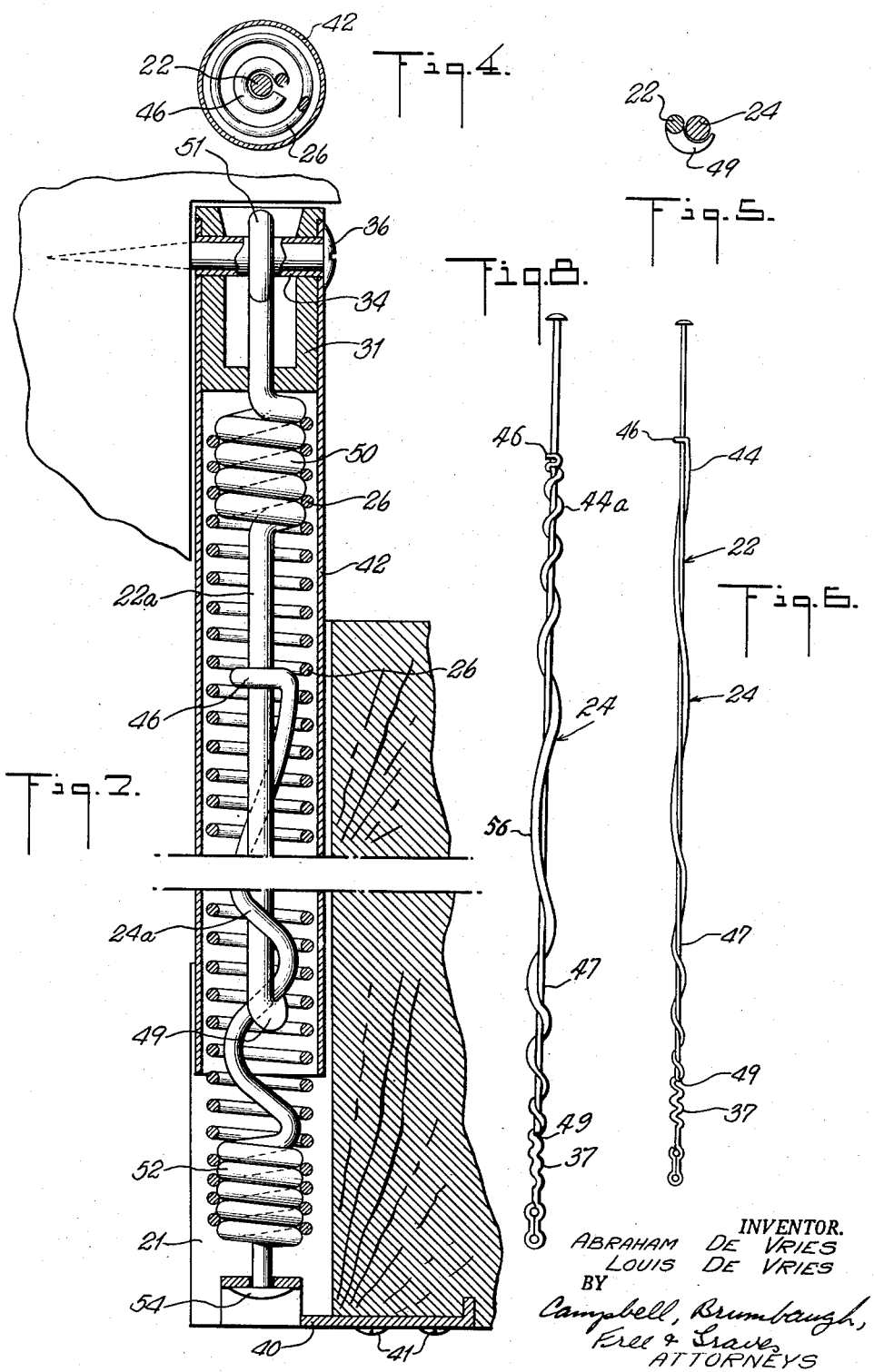

2,702,920

EXTENSIBLE SPRING BALANCE

Abraham de Vries and Louis de Vries, Carmel, Calif.

Application August 30, 1950, Serial No. 182,369

9 Claims. (Cl. 16—197)

The present invention relates to an improvement in spiral mechanisms for extensible spring balances and to an improvd extensible spring balance which exerts a substantially constant force as it is contracted or extended and is therefore particularly suitable for balancing windows sash.

It is known that extensible spring balances have replaced, to a great extent, the sash cord and weight type of balance used earlier for balancing window sash. These spring balances are usually provided with a flat strip of metal twisted spirally to have a variable pitch and engaged with a slotted bushing carried by a coil spring. As the balance is extended or contracted, the slotted bushing rides on the spiral strip, and in following the convolutions thereof, tends to unwind or wind up the torsion spring. The torque exerted by the spring is transmitted through the slotted bushing to the spiral strip and the longitudinal component thereof is dependent upon the pitch of the spiral at the place where it is engaged by the slotted bushing. This component of the torque is utilized to equalize the variable force exerted by the same or another spring upon a change in the effective length thereof.

Thus, for example, if a tension spring is utilized, the mechanism is so arranged that the slotted bushing will engage the spiral strip at a point of minimum pitch when the balance is fully contracted and at a point of maximum pitch when it is fully extended. In this arrangement, the longitudinal component, in a direction tending to contract the balance, of the torque exerted on the strip by the spring will be at a maximum when the balance is in its contracted position and the tensile force of the spring is at a minimum, and at a minimum when the balance is in its fully extended position and the tensile force of the spring is at a maximum.

While balances of this type have found wide acceptance and have been highly successful, they do have several important disadvantages. One of the disadvantages is that the minimum pitch of the spiral is rather limited because of the angular displacement of a spiral segment from the longitudinal. This can readily be understood by visualizing a slotted bushing wherein the slot is of a size just large enough to accommodate a straight strip. As soon as the strip is twisted, the slot must be enlarged to accommodate the strip without binding and the more tightly twisted the strip becomes, the larger or wider must be the slot.

Another disadvantage of the spiral strip and slotted bushing constructions heretofore proposed is that the contact between the slotted bushing and the surface of the spiral strip involves considerable friction. This disadvantage is quite important because the longitudinal reaction force exerted by the spiral strip due to the torque of the spring is reduced by the frictional force that must be overcome to induce a sliding of the slotted bushing upon and relative to the surface of the spiral strip.

It has now been found that the foregoing disadvantages can be overcome and the construction of extensible spring balances can be simplified considerably by utilizing, in place of the spirally twisted, flat strip and cooperating slotted bushing, a straight rod member and a wire member wound spirally around the straight rod member, the wound wire member, referred to herein as a spiral member, having means at one end for slidably engaging the rod member and the rod member having means at one end for slidably engaging the spiral of the spiral member and following the convolutions thereof upon relative endwise and rotational movement of the two members.

In the preferred embodiment of the invention, the spiral member is a stiff wire having a circular cross section. It is provided with convolutions of rapidly decreasing pitch toward at least one end. The straight rod member, which is likewise preferably of circular cross section, is provided at its inner end with a nipple member for engaging the convolutions of the spiral member. An extensible torsion spring, which may be either a coiled compression or tension spring, encloses the straight rod member and the spiral member, one end of the spring being carried by the outer end of the straight rod member and the other end of the spring being carried by the outer end of the spiral member. These elements are so arranged that the resultant force exerted by the combination will remain substantially constant whether the balance be contracted to its minimum length, expanded to its maximum length, or made to assume any position intermediate its minimum and maximum lengths. This is accomplished by utilizing the longitudinal component of the torque exerted by the spring on the spiral member to equalize an increase or decrease in the tensile or compressive force of the spring upon a change in the length thereof.

This construction reduces the friction very considerably inasmuch as contact between the two members takes place between surfaces of round cross section and therefore along a minimum area of contact. Furthermore, the number of convolutions in the spiral strip at the end or ends of minimum pitch may be as high as three or more to the inch without causing any binding action whereas in the flat rod type it is impracticable to have more than one complete convolution in less than about 1½ inches.

The advantages and utility of the invention will become apparent from the following detailed description, made with reference to the accompanying drawing, and from the examples forming a part of the description.

In the drawings:

Figure 1 is a view in elevation of a window sash and frame showing part of the frame removed to reveal a sash balance;

Figure 2 is a cross sectional view in elevation of one embodiment of the sash balance of this invention;

Figure 3 is a plan view in cross section taken along section line 3—3 of Figure 2;

Figure 4 is a plan view in cross section taken along section line 4—4 of Figure 2;

Figure 5 is a detailed plan view taken along section line 5—5 of Figure 2;

Figure 6 is a view in elevation of the straight rod and spiral members shown in Figure 2;

Figure 7 is a cross sectional view in elevation of another embodiment of the invention; and Figure 8 is a view, similar to Figure 6, of another embodiment of the invention.

Referring to Figure 1 of the drawing, the reference numeral 10 refers to the jambs of a window frame having a head 11 and a base 12 and containing two vertically slidable window sashes each comprising a pane 14, a check rail 16, a bottom rail 17 and two stiles 19. Sash balances, indicated generally at 20, may be provided on one or both sides of each window sash and preferably be fitted into a groove 21 in stile 19.

The sash balance illustrated in Figure 2 includes a straight rod member 22, a spiral member 24, an extensible coil spring 26, a bottom support 27 secured to one end of the spring 26 and the spiral member 24, and an upper support 29 secured to the other end of the spring 26 and to the outer end 30 of the straight rod member 22 which extends through, and is rotatable within, a support 31 provided with a thrust bearing 32 and an eyelet 34, the eyelet being adapted to receive a fastening member 36, such as a wood screw, to fasten the upper end of the balance to the upper end of the jamb 10.

The outer end 37 of the spiral member 24 is fastened, by means of rivets 39 or the like, to a bottom fitting or bracket 40, which in turn is secured to the bottom rail 17 of the sash by fastening means such as wood screws 41. The sash balance 20 may, if desired, be provided with an outer covering tube 42.

The spiral member 24, preferably constructed of a relatively stiff wire having a circular cross section, is spirally wound around the straight rod member 22. In the embodiment illustrated in Figures 2–6, the number of convolutions per unit length in the spiral member increases toward the outer end 37 of the spiral member 24 so that the pitch thereof will be a minimum at the end 37. The inner end 44 of the spiral member 24 is twisted, at 46, around the rod member 22 to securely but slidably engage said rod member. The inner end 47 of the rod member 22 is provided with a lip member or nipple 49 to engage the convolutions of the spiral member 24. In the embodiment illustrated in Figure 8 the convolutions of the spiral member are of maximum pitch at the midpoint 56 and of decreasing pitch, in opposite directions, towards the two ends 37 and 44a.

In operation, the longitudinal force exerted by the coil spring 26 will vary as it is extended or contracted. This variation in force is compensated by the longitudinal component of the torque exerted by the spring on the spiral member 24 by way of the rod member 22. Thus, for example, if a tension spring is employed and the sash is at its uppermost position, so that the balance is in its most contracted position, the force exerted in an upwardly direction due to the tension of the spring will be at a minimum. In this condition, the lip member 49 at the inner end of the rod member 22 is in engagement with the outer end of the spiral member 24, i. e., at a point where its pitch is at a minimum. The longitudinal component of the torque exerted by the spring will, therefore, be at a maximum. As the sash is lowered, the spring is extended and the lip member 49 is made to follow the convolutions of the spiral member 24 to wind up the spring. Due to the extension of the spring, the longitudinal force exerted by the tension thereof is increased to a maximum when the window is at its lowermost position. At this point, the lip member 49 engages the spiral member at its inner end, i. e., when the pitch of the convolutions of the spiral member is at a maximum. Thus, when the sash is lowered, the longitudinal component of the torque decreases and thereby compensates for the increase in the tensile force exerted by the spring as it is stretched.

The embodiment illustrated in Figure 7 is substantially similar but of somewhat simplified construction. In this embodiment of the rod member 22a is provided with a tightly twisted portion 50 to engage the upper end of the extensible coil spring 26 and an eyelet 51 adapted to be secured in position by the eyelet 34 for the fastening means 36. The outer end of the spiral member 24a is likewise provided with a tightly twisted portion 52 adapted to securely receive the lower end of the spring 26 and with a head portion 54 engaged by and rotatable relative to the bracket 40. In this construction, the two ends of the spring 26 are securely wound on the tightly twisted portions 50 and 52 of the rod member 22a and the spiral member 24a, respectively. The operation of this embodiment is similar to that described with reference to the embodiment illustrated in Figures 2 to 6.

It is to be understood, of course, that the present invention is not to be limited to the construction specifically illustrated and described herein but that it is intended to include within the scope of this invention all modifications and changes that will become apparent to those skilled in the art upon reading the description thereof. It is also to be understood that the invention is not limited in use to sash balances but that it may be applied to all types of extensible balances such as those used on garage doors and the like.

We claim:

1. An extensible balance adapted to be connected to two relatively movable parts of a structure for exerting a substantially constant force upon said parts at various relative positions thereof which comprises a spiral member; a rod member in engagement with the spiral member for rotation and longitudinal movement relative to and within the spiral member; an extensible coil spring enclosing the spiral and rod members, said rod member having a substantially straight portion extending into the spring toward one end of the spring and terminating in a lip member, and said spiral member having convolutions extending into the spring toward the other end of the spring, said convolutions being spirally wound around the straight portion of the rod member and engageable with the lip member; means at one end of the spiral member carrying said one end of the spring and securing said ends of the spiral member and spring against rotational and longitudinal movements relative to one another at said ends; means at one end of the rod member carrying said other end of the spring and securing said one end of the rod member and said other end of the spring against rotational and longitudinal movements relative to one another at said secured ends; means for connecting said one end of the spiral member to one of the relatively movable parts; and means for connecting said one end of the rod member to the other of the relatively movable parts, at least one of said connecting means being rotatable relative to the end of the member adapted to be connected to one of the movable parts.

2. The balance defined in claim 1 in which the convolutions of the spiral member are of decreasing pitch toward at least one end thereof.

3. The balance defined in claim 1 in which the convolutions of the spiral member are of decreasing pitch toward one end thereof.

4. The balance defined in claim 1 in which the convolutions of the spiral member are of maximum pitch at the mid-point and of decreasing pitch, in opposite directions, toward the two ends thereof.

5. An extensible balance adapted to be connected to two relatively movable parts of a structure for exerting a substantially constant force upon said parts at various relative positions thereof which comprises a spiral member; a rod member in engagement with the spiral member for rotation and longitudinal movement relative to and within the spiral member; an extensible coil spring enclosing the spiral and rod members, said rod member having a substantially straight portion extending into the spring toward one end of the spring and terminating in a lip member, and said spiral member having convolutions extending into the spring toward the other end of the spring, said convolutions being spirally wound around the straight portion of the rod member and engageable with the lip member; means at one end of the spiral member carrying said one end of the spring and securing said ends of the spiral member and spring against rotational and longitudinal movements relative to one another at said ends; means at one end of the rod member carrying said other end of the spring and securing said one end of the rod member and said other end of the spring against rotational and longitudinal movements relative to one another at said secured ends; means for rotatably connecting said one end of the spiral member to one of the relatively movable parts; and means for connecting said one end of the rod member to the other of the relatively movable parts.

6. An extensible balance adapted to be connected to two relatively movable parts of a structure for exerting a substantially constant force upon said parts at various relative positions thereof which comprises a spiral member; a rod member in engagement with the spiral member for rotation and longitudinal movement relative to and within the spiral member; an extensible coil spring enclosing the spiral and rod members, said rod member having a substantially straight portion extending into the spring toward one end of the spring and terminating in a lip member, and said spiral member having convolutions extending into the spring toward the other end of the spring, said convolutions being spirally wound around the straight portion of the rod member and engageable with the lip member; means at one end of the spiral member carrying said one end of the spring and securing said ends of the spiral member and spring against rotational and longitudinal movements relative to one another at said ends; means at one end of the rod member carrying said other end of the spring and securing said one end of the rod member and said other end of the spring against rotational and longitudinal movements relative to one another at said secured ends; means for connecting said one end of the spiral member to one of the relatively movable parts; and means for rotatably connecting said one end of the rod member to the other of the relatively movable parts.

7. An extensible balance adapted to be connected to two relatively movable parts of a structure for exerting a substantially constant force upon said parts at various relative positions thereof which comprises a spiral member, a rod member in engagement with the spiral member for rotation and longitudinal movement relative to and within the spiral member, and an extensible coil spring enclosing the spiral and rod members, said spiral member having one end secured to one end of the spring against rotational and longitudinal movements relative to one another at said ends and being adapted to be connected at said one end to one of the relatively movable parts, said rod member having one end secured to the other end of the spring against rotational and longitudinal movements relative to one another at said secured ends and being adapted to be connected at said one end to the other of the relatively movable parts, said rod member further having a substantially straight portion extending into the spring toward said one end of the spring and terminating in a lip member and said spiral member further having convolutions extending into the spring toward said other end of the spring, said convolutions being spirally wound around the straight portion of the rod member and engageable with the lip member for imparting relative rotational movement to the two ends of the spring upon a change in the length thereof.

8. An extensible balance adapted to be connected at one end to a window frame and at the other end to a window sash slidable in said frame which comprises a spiral member, a rod member in engagement with the spiral member for rotation and longitudinal movement relative to and within the spiral member, and an extensible coil spring enclosing the spiral and rod members, said spiral member being tightly twisted at one end for carrying one end of the spring and securing said one end of the spring against rotational and longitudinal movements relative to said secured end of the spiral member and being adapted to be connected rotatably at said secured end to the window sash, said rod member being tightly twisted at one end for carrying the other end of the spring and securing said other end of the spring against rotational and longitudinal movements relative to said one end of the rod member and being adapted to be connected at said one end to the window frame, said rod member further having a substantially straight portion extending into the spring toward said one end of the spring and terminating in a lip member and said spiral member further having convolutions extending into the spring toward said other end of the spring, said convolutions being spirally wound around the straight portion of the rod member, of decreasing pitch toward the secured end of the spiral member, and engageable with the lip member for imparting relative rotational movement to the two ends of the spring upon a change in the length thereof.

9. An extensible balance adapted to be connected at one end to a window frame and at the other end to a window sash which comprises a spiral member, a rod member in engagement with the spiral member for rotational and longitudinal movements relative to and within the spiral member, and an extensible coil spring enclosing the spiral and rod members, said spiral member having one end secured to one end of the spring against rotational and longitudinal movements relative to one another at said secured ends and being adapted to be connected at said secured end to the window sash, said rod member having one end secured to the other end of the spring against rotational and longitudinal movements relative to one another at said secured ends and being adapted to be rotatively connected at said one end to the window frame, said rod member further having a substantially straight portion extending into the spring toward said one end of the spring and terminating in a lip member and said spiral member further having convolutions extending into the spring toward said other end of the spring, said convolutions being spirally wound around the straight portion of the rod member, of decreasing pitch toward the secured end of the spiral member, and engageable with the lip member for imparting relative rotational movement to the two ends of the spring upon a change in the length thereof.

References Cited in the file of this patent

UNITED STATES PATENTS

| Number | Name | Date |
|---|---|---|
| 428,999 | Austin | May 27, 1890 |
| 863,797 | Hill | Aug. 20, 1907 |
| 1,508,863 | Webster | Sept. 16, 1924 |
| 2,041,646 | Larson | May 19, 1936 |
| 2,565,804 | De Vries et al. | Aug. 28, 1951 |
| 2,577,953 | De Vries et al. | Dec. 11, 1951 |
| 2,604,655 | Peremi | July 29, 1952 |